March 26, 1968 — F. J. HOHL — 3,374,880
GUARD FOR APRON CONVEYORS
Filed Sept. 29, 1966 — 2 Sheets-Sheet 1
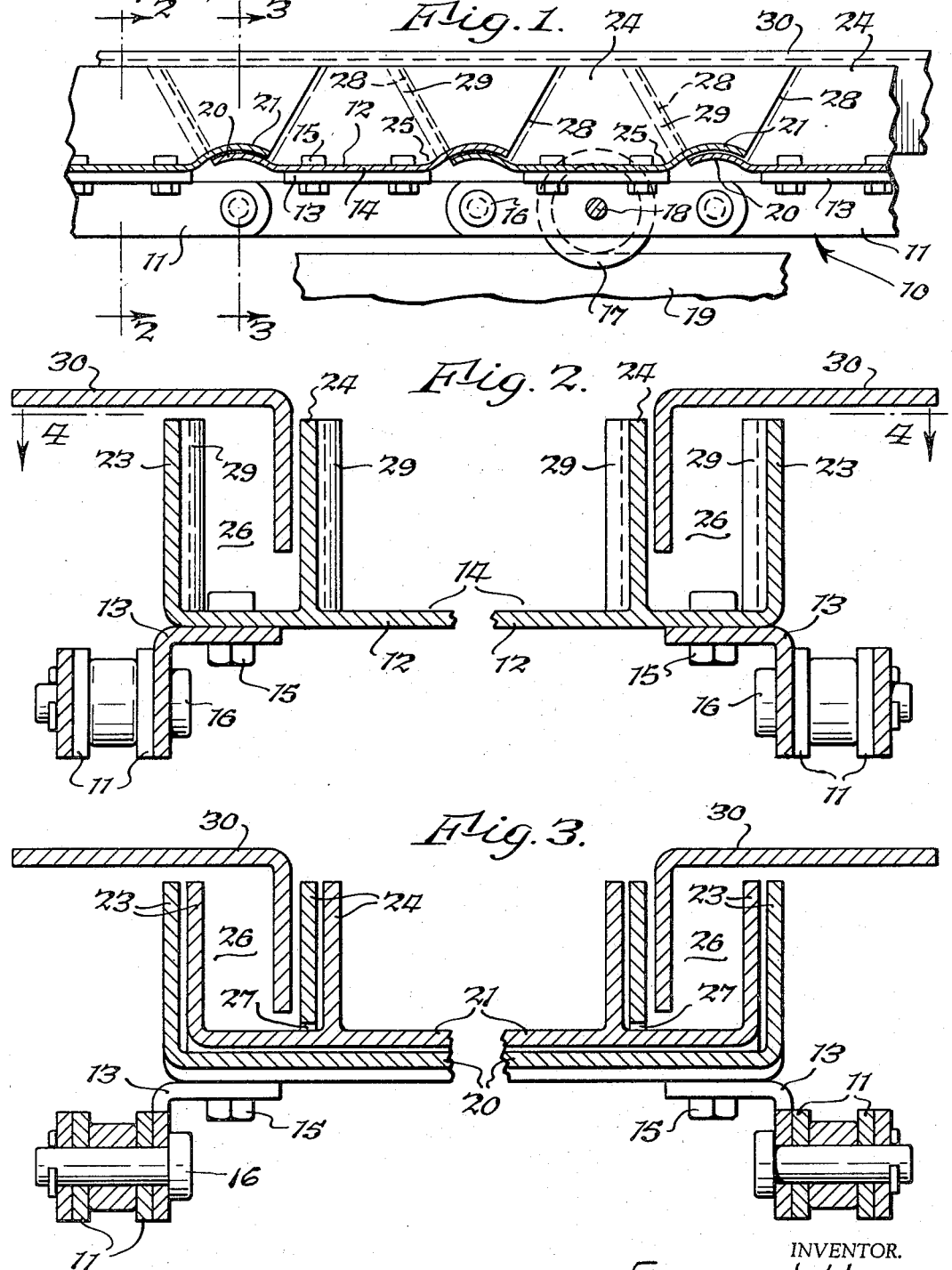
INVENTOR.
FRANK J. HOHL
BY Christel & Bean
ATTORNEYS.

March 26, 1968  F. J. HOHL  3,374,880
GUARD FOR APRON CONVEYORS

Filed Sept. 29, 1966  2 Sheets-Sheet 2

INVENTOR.
FRANK J. HOHL
BY
Christel & Bean
ATTORNEYS.

ated Mar. 26, 1968

United States Patent Office 3,374,880

3,374,880
GUARD FOR APRON CONVEYORS
Frank J. Hohl, Snyder, N.Y., assignor to Hohl Machine & Conveyor Co., Inc., Buffalo, N.Y.
Filed Sept. 29, 1966, Ser. No. 582,839
10 Claims. (Cl. 198—196)

ABSTRACT OF THE DISCLOSURE

A plurality of aprons are arranged in overlapping relation to define a continuous conveyor supported for longitudinal movement. Inner and outer laterally spaced flights are secured to each apron adjacent each side margin for movement therewith. The flights project upwardly and form with the associated confined margins overflow channels extending continuously along the conveyor for retaining material overflowing the inner flights.

---

This invention relates generally to material handling conveyors and in particular to a guard for apron conveyors for preventing lateral leakage or discharge of material carried by the conveyor.

Material transferred by apron conveyors such as gravel, castings and sand or other fine or loose material, tends to discharge or overflow laterally from the sides of the conveyor during movement thereof between transfer stations. Aside from diminishing the capacity of the conveyor and littering the conveyor environs with discharged material, the overflow oftentimes clogs and stops the conveyor drive. Moreover, the movable conveyor parts are subject to unnecessary wear due to binding and increased frictional resistance imposed by the clogging material which also excessively increases the load on the conveyor drive.

Prior art solutions to this problem, such as spill plates or upstanding flights have not proven effective since, in the former solution, material can wedge between the conveyor apron and the spill plates and, in the latter solution, material can still build up and discharge over the top of the flight. In both cases, the overflow, while reduced, can still clog the conveyor. Guards fixed adjacent or depending over opposite edges of the conveyor have been employed but these too allow material to pass between the guard and the conveyor apron and wedge or bind on the conveyor. Various combinations of fixed guards and movable flights, such as spacing depending guards inwardly or outwardly of the upstanding flights or even vertically alining the guards and flights, have been utilized. None of these arrangements has entirely prevented lateral leakage of the material or eliminated consequent reduction in conveyor capacity and efficiency.

Accordingly, it is a primary object of the present invention to provide a guard for an apron conveyor which will effectively prevent lateral leakage of material transferred by the conveyor.

It is also an object of the present invention to provide a guard for an apron conveyor which will accumulate overflow material on the moving conveyor and transfer such material to the designated discharge station thereby maintaining conveyor capacity and eliminating any need for cleaning or removal of overflow material from the conveyor surroundings.

It is another object of the present invention to provide a guard for an apron conveyor which substantially reduces the wedging or binding action between the guard and the material conveyed and which may be easily and economically manufactured.

In one aspect thereof a conveyor constructed in accordance with the present invention is characterized by a conveyor apron, means supporting the apron for longitudinal movement, and inner and outer laterally spaced flights secured to the apron adjacent each side margin thereof for movement therewith, each pair of flights projecting upwardly from the apron and forming with the associated confined margin an overflow receptacle whereby material overflowing the inner flights is retained in the receptacle for movement with the conveyor.

Various other novel features of construction and advantages inherent in the conveyor apron guard construction of the present invention are pointed out in detail in conjunction with the following detailed description of a typical embodiment thereof considered in conjunction with the accompanying drawings depicting the same wherein like numerals represent like parts through the various views and wherein:

FIG. 1 is a fragmentary vertical sectional view of an apron conveyor guard constructed in accordance with the present invention;

FIG. 2 is an enlarged transverse cross sectional view thereof taken about on line 2—2 of FIG. 1 and having portions broken out for ease of illustration;

FIG. 3 is a view similar to FIG. 2 but taken about on line 3—3 of FIG. 1; and

Figure 4:
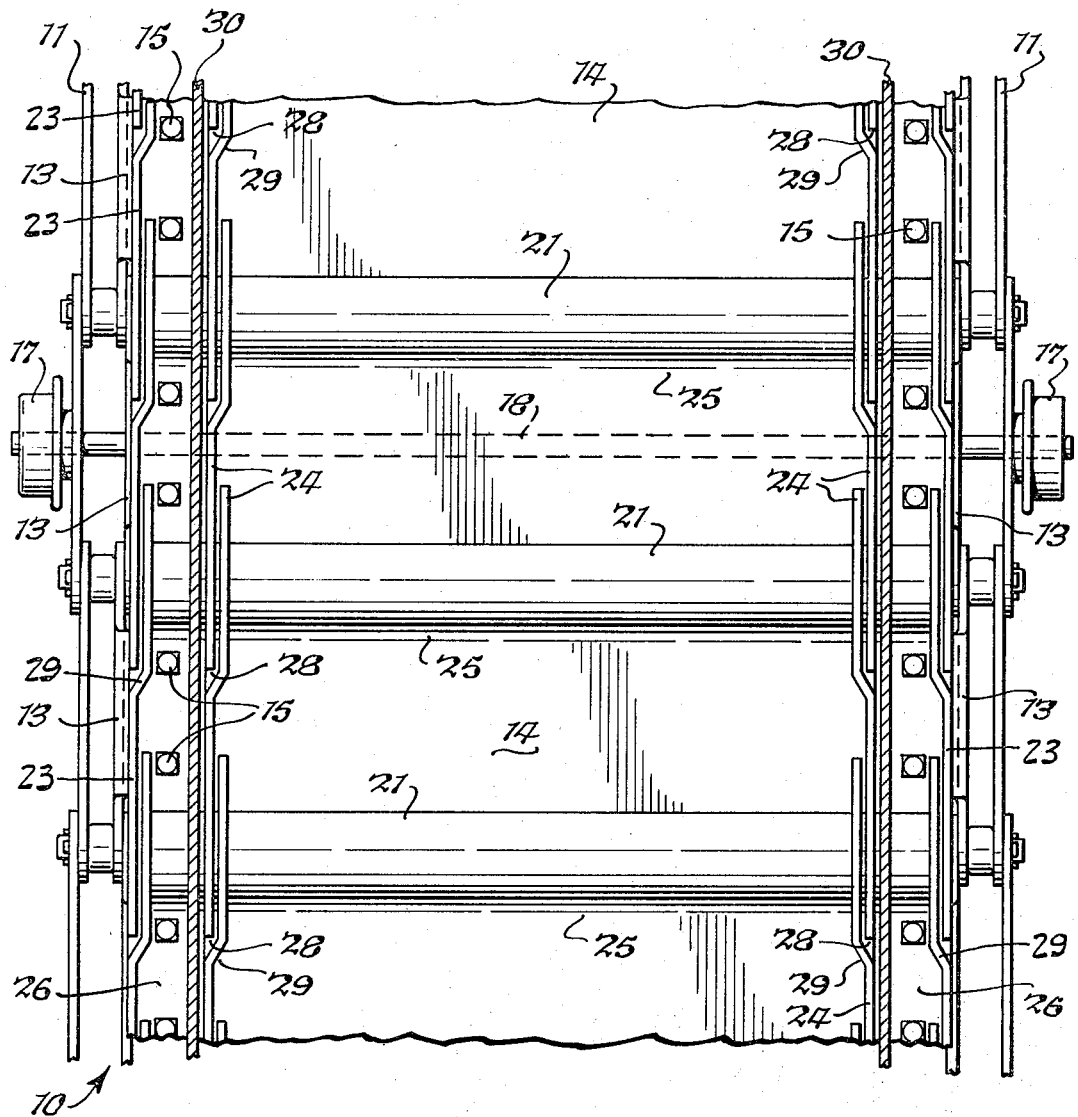
FIG. 4 is a longitudinal sectional view thereof taken about on line 4—4 of FIG. 2 and on a reduced scale.

Referring now to the drawings and in particular to FIG. 1 there is shown an apron conveyor generally designated 10 having the usual arrangement of paired chain links 11 supporting a plurality of apron pans 12 therebetween by a plurality of paired, oppositely disposed angle members 13 secured to medial portions 14 of pans 12 by bolts 15 and to mid-pitch points of alternate chain links 11 by chain pins 16. In the illustrated form, outboard rollers 17 are assembled on through rods 18 with the rollers supporting the conveyor on a pair of tracks 19, although other conventional conveyor support means can be utilized with the present invention without departing from the scope thereof.

Medial portions 14 of pans 12 are flat and the opposite ends thereof are raised and arcuately bent about the pitch axes at opposite ends of their associated chain links to form transverse arcuate surfaces 20 and 21. Arcuate surfaces 21 are raised from associated portions 14 a greater extent than surfaces 20 and have a correspondingly larger radius. The pans 12 are arranged in end-to-end overlapping relation with opposite end surfaces 21 and 20 of each pan respectively overlying and underlying associated end surfaces 20 and 21 of the next adjacent pans 12. End surfaces 21 usually are the leading ends and surfaces 20 the trailing ends of the pans, the conveyor moving from left to right in FIG. 1. The surfaces 20 and 21 are concentrically overlapped about the associated pitch axes to provide relative intersliding movement therebetween when the chain links revolve on an end sprocket, not shown, and to preclude formation of a transverse gap between adjacent pans during movement thereof about the sprocket, such arrangements being well known in the art.

In accordance with this invention, a pair of upstanding flights are formed on each of the opposite side margins of the several pans 12, each comprising an outer flight 23 and an inner flight 24. Outer flights 23 extend upwardly from the side edges of each pan 12 and extend longitudinally therealong from the edge of surface 20 to a point 29 adjacent the juncture 25 of flat portion 14 and surface 21 whereat the pan and flights are inwardly offset to accommodate outer flights 23 on the next adjacent pan. Inner flights 24 are spaced inwardly from outer flights 23 and extend upwardly to form with outer flights 23 and the confined margins of apron 12 therebetween a pair of channels 26 adjacent opposite sides of conveyor 10 which extend the length of the conveyor for purposes as will presently appear. Inner flights 24 extend longitudinally from the edge of surface 20 to a point 29 adjacent juncture 25 whereat they are inwardly offset to accommodate inner flights 24 on the next adjacent pan 12. Inner flights 24 are arcuately slotted at their juncture with surface 20, as seen at 27 in FIG. 3, to receive surface 21 of a next adjacent pan so that the same may slide in the slot concentric with surface 20.

Flights 23 and 24 are identical to each other, with the exception of slots 27 in the inner flights, and each have inclined vertical edges 28 at opposite ends thereof as seen in FIG. 1 which project upwardly and away from each other. The junctures 29 whereat flights 23 and 24 are bent to provide the inward offset extend upwardly parallel to the edges 28 which are adjacent surface 20. The inclination of the edges 28 and the offset junctures 29 allows the conveyor to rotate about end sprockets without opening a lateral gap between adjacent flights 23, 23 and 24, 24 and permits the paired flights of each pan to nest in the associated lateral offset portion of the paired flights of the next adjacent pans as clearly shown in FIG. 4.

Guard members 30 are provided and extend from a conveyor support, not shown, inwardly across outer flights 23 and downwardly along the length of the conveyor between each pair of inner and outer flights 24, 23. Guard members 30 are closely spaced along the outer faces of inner flights 24 with the lower ends thereof spaced just above surfaces 21.

In use, material to be conveyed is deposited between inner flights 24 and carried along by the conveyor. Inner flights 24 have sufficient height to usually confine the material therebetween. If unusually large deposits are made, the close spacing of guard members 30 and inner flights 24 prevents the larger chunks thereof from overflowing and spilling over the top edges of flights 24 into the channels 26. Fine material, however, is allowed to pass over the top edges of flights 24 and fall downwardly between guard members 30 and inner flights 24 into channels 26. Binding and wedging between inner flights 24 and guard members 30 is substantially reduced by spacing them in a manner permitting spillover of the fine material which then empties into channels 26 and is prevented from discharging laterally into the chain links by the outer flights 23. Thus the material which spills into channels 26 is conveyed along with the main body of material between inner flights 24 to an end receptacle, not shown, where both deposits are collected. In other words, any overflow material in channels 26 is emptied along with the main body of material between inner flights 24, as that conveyor portion ends its conveying flight and passes around end sprockets to its return flight.

The overlapping or nesting plates of the inner flights 24 maintain a continuous barrier against lateral spillover and that portion of the fine material which may work between the nested inner flights or spill over the top of the inner flights empties into channels 26. The quantity confined within the channels is minimal and the conveyor will usually reach its discharge end before a substantial quantity of material is discharged into channels 26. In any vent, it is held against discharge or lateral overflow from the conveyor by outer flights 23.

Having thus described and illustrated a preferred form of my invention, it will be understood that such description and illustration is by way of example only and that such modifications and changes as may suggest themselves to those skilled in the art are intended to fall within the scope of the present invention which is to be limited only by the scope of the appended claims. Also, arrangement of this invention can readily be incorporated in apron conveyors of styles and pan formations other than that shown.

What I claim is:

1. Apparatus for preventing lateral discharge of material carried on a conveyor comprising a plurality of conveyor aprons overlapping to define a continuous conveyor, means supporting said aprons for longitudinal movement, inner and outer laterally spaced flights secured to each of said aprons adjacent each side margin thereof for movement therewith, said flights projecting upwardly from the associated aprons and forming with the associated confined margins overflow channels extending continuously along said conveyor whereby material overflowing said inner flights is retained in said channels for movement with the conveyor.

2. Apparatus according to claim 1 including fixed depending guard members extending between and in laterally spaced relation to said inner and outer flights, said guard members having their lower edges spaced above said side margins of said apron.

3. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, said conveyor having a plurality of aprons each having paired flights secured therealong adjacent each side margin thereof, each of said paired flights overlapping the next adjacent pairs thereof along the corresponding side margin of the conveyor.

4. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, said conveyor having a plurality of aprons each having paired flights secured therealong adjacent each side margin thereof, and wherein end portions of each of said paired flights are laterally offset to receive end portions of a next adjacent pair of flights along the corresponding side margin in nesting relation.

5. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, fixed depending guard members extending between and in laterally spaced relation to said inner and outer flights, said guard members having their lower edges spaced above said side margins of said apron, said conveyor having a plurality of aprons each having paired flights secured therealong adjacent each side margin thereof, each of said paired flights overlapping the next adjacent pairs thereof along the corresponding side margin, and each of said guard members being closely spaced adjacent the associated inner flights along the conveying flight of said conveyor.

6. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, fixed depending guard members extending between and in laterally spaced relation to said inner and outer flights, said guard members having their lower edges spaced above said side margins of said apron, said conveyor having a plurality of aprons each having paired flights secured therealong adjacent each side margin and wherein end portions of each of said paired flights are laterally offset to receive end portions of a next adjacent pair of flights along the corresponding side margin in nesting relation, each of said guard members being closely spaced adjacent the associated inner flights.

7. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, said conveyor comprising a plurality of apron pans together with means connecting adjacent pans for unitary movement along said support means, and wherein said paired flights are secured adjacent the side margins of each pan, each of said paired flights overlapping the next adjacent pairs thereof.

8. Apparatus according to claim 7 including a fixed depending guard member extending along each side of the conveyor and spaced between the inner and outer flights of each paired flight, the inner face and lower edge of each guard member being closely spaced to the associated inner flights and confined side margins of said apron pans respectively.

9. Apparatus for preventing lateral discharge of material carried on a conveyor comprising a conveyor apron, means supporting said apron for longitudinal movement, inner and outer laterally spaced flights secured to said apron adjacent each side margin thereof for movement therewith, each pair of said flights projecting upwardly from said apron and forming with the associated confined margin an overflow channel whereby material overflowing said inner flights is retained in said channels for movement with the conveyor, said conveyor comprising a plurality of apron pans together with means connecting adjacent pans for unitary movement along said support means, and wherein said paired flights are secured adjacent side margins of each pan with end portions of each of said paired flights laterally offset to receive end portions of a next adjacent pair of flights along the corresponding margin in nesting relation.

10. Apparatus according to claim 9 including a fixed depending guard member extending along each side of the conveyor and spaced between the inner and outer flights of each paired flight, the inner face and lower edge of each guard member being closely spaced to the associated inner flights and confined side margins of said apron respectively.

References Cited

UNITED STATES PATENTS 559,370   5/1896   Dodge _____ 198—201

FOREIGN PATENTS 888,618   8/1960   Great Britain.

RICHARD E. AEGERTER, *Primary Examiner.*